April 15, 1947.    G. J. HOUSTON    2,418,885
ROPE FASTENER DEVICE
Filed June 14, 1945
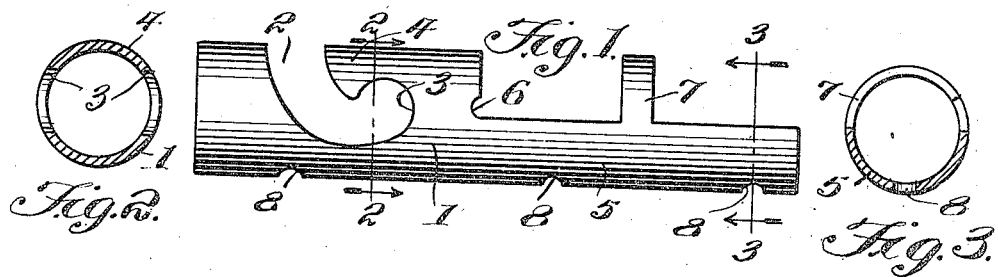
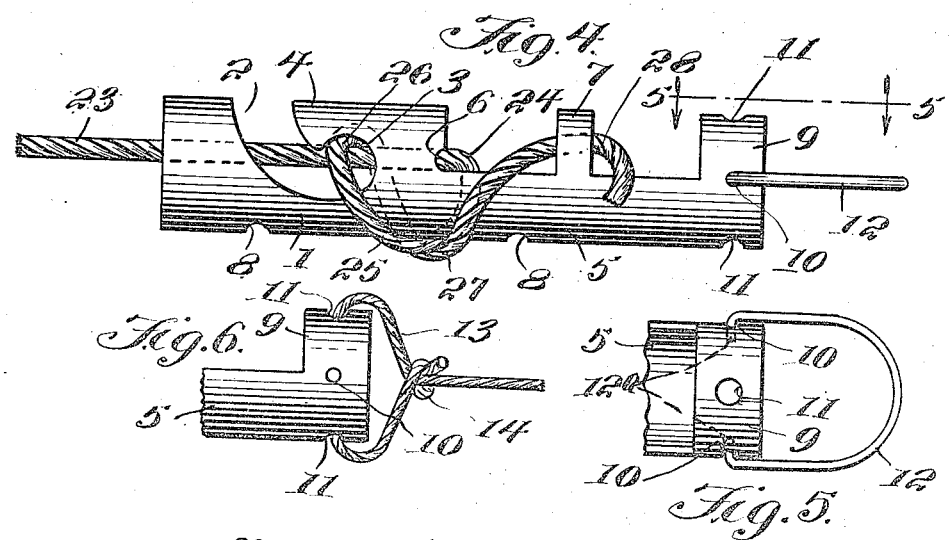
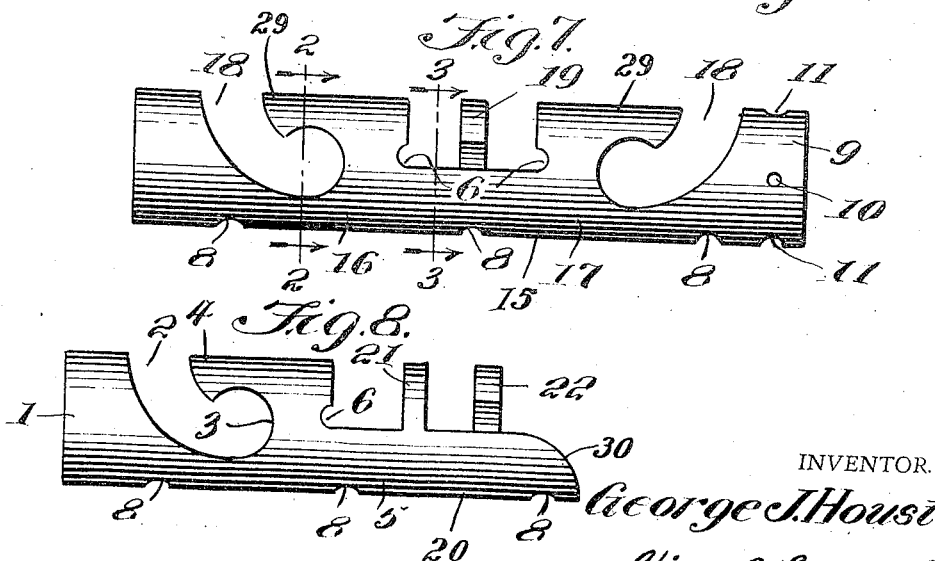
INVENTOR.
George J. Houston,
BY Victor J. Evans & Co.
ATTORNEYS Patented Apr. 15, 1947

2,418,885

UNITED STATES PATENT OFFICE 2,418,885

ROPE FASTENER DEVICE

George J. Houston, Scranton, Pa.

Application June 14, 1945, Serial No. 599,466

9 Claims. (Cl. 24—129)

My present invention, in its broad aspect, has to do with improvements in rope clamps and is designed to receive the end, or ends, of a rope to be tied in such a manner that a loop of the rope binds tighter against the body of the rope the more strain is placed on the rope to the end that possible slipping or loosening of the knot is prevented, although the rope may be easily disengaged or untied when desired. My invention includes a substantially cylindrical body formed with a curved loop engaging slot and back of which is a semi-circular slot between the body and a hook-shaped keeper through which the end of the rope is first trained before it is looped in the curved slot about the body, and the free end deposited in the keeper. My device may be constructed to receive the ends of two ropes, as well as one, and accordingly may be used as a coupling, or it may be attached to a base and used after the manner of a cleat. Furthermore, means are provided at the end of my device for attaching a section of rope as by looping and tying the same or by a bail, and my device may be formed of suitable materials other than metal, and is simple, sturdy, and practical.

Other and equally important objects and advantages of my invention will be apparent from the following description and drawings, and it is pointed out that changes in form, size, shape, materials, and construction and arrangement of parts is permissible and within the purview of my broad inventive concept and the scope of the appended claims.

In the drawings wherein I have illustrated a preferred form of my invention:

Figure 1 is a side view of my rope clamp;

Figure 2 is a section on the lines 2—2 of Figures 1 and 7;

Figure 3 is a section on the lines 3—3 of Figures 1 and 7;

Figure 4 is a slightly modified form of my clamp showing the manner of anchoring a rope end therein;

Figure 5 is a view on the line 5—5 of Figure 4;

Figure 6 is a slightly modified form shown as looped and tied through an end of my clamp;

Figure 7 is a side view of another modified form wherein two rope ends may be anchored, and this form is especially adaptable for use as a rope coupling, and Figure 8 is a side view of another slightly modified form of my invention.

In the drawings wherein like characters of reference are used to designate like or similar parts throughout the several views:

The numeral 1 designates the cylindrical body of my clamp, which is provided with a curved slot 2 between its ends terminating on each side in a slightly upwardly curved or hooked end 3. The slot extends more than half way through the body and forms a hooked lip portion 4 on the body. The body has a semi-circular extension 5 at one end, and the end edge of the body is notched as at 6 at the extension on both sides. The extension has a hook-shaped keeper 7 formed thereon spaced from its free end. The body has screw or bolt openings 8 for attaching it to a base if desired. As shown in Figures 4, 5, 6 and 7, my device may have a ring-like portion 9 at the end having pairs of openings 10 and 11 respectively, one set to receive a substantially U-shaped rope attaching bail 12 and the other to receive the looped end 13 of a rope to be tied as at 14. The bail has inwardly bent lugs or fingers 12a for engaging in openings 10. In Figure 7, I have shown the extension 15 between the body parts 16 and 17 each of which has a curved slot 18 which extends more than half way through the body parts 16 and 17, and forms hooked lip portions 29 on the body parts so that the device may be used for two rope ends or to couple two ropes. The hooked keeper 19 is between the body parts on the extension 15. In Figure 8 my device is similar to that shown in Figure 1, except that the extension 20 is provided with an outwardly curved outer end 30. The extension 20 has a ring-like part 21 formed thereon and spaced inwardly from its curved outer end 30 and a hooked keeper 22 formed thereon intermediate the ring-like part 21, and its curved outer end 30.

In operation, the end 23 of a rope is trained through the body 1, then turned downwardly as at 24 over the side of the extension 5 and in notches 6 and is looped back under the extension and body as at 25 and through the curved slot 2 to form a loop 26 over the end 23; it is then turned down under the body and up over the side of the extension 5 as at 27 and the free end 28 deposited in the hooked-keeper 7. In the form shown in Figure 7, two ends of a rope are trained through the body parts at opposite ends of the clamp and turned and looped through the curved slots as above described.

From the foregoing, it is believed that the operation and advantages of my invention will be apparent, but it is again emphasized that interpretation of its scope should only be conclusive when made in the light of the subjoined claims.

I claim:

1. A rope clamp, comprising a cylindrical body formed with a curved slot extending through a greater part of the diameter of the body and having an upwardly curved or hooked end, a semi-circular extension on the body, and a hooked keeper on the extension, the end of the body being notched on both sides at the extension to receive the end of a rope trained through the body, turned down and back under the extension and body and looped through the curved slot over the rope and down, under and over the side of the extension and through the hooked keeper.

2. A rope clamp, comprising a cylindrical body formed with a curved slot extending through a greater diameter of the body, an extension on the body, a keeper on the extension spaced from the body, and a ring-like member over the end of the extension and spaced from the keeper to attach a rope end.

3. The invention as defined in claim 1 wherein the body has openings for attaching means to attach the body to a base, and wherein the curved slot forms a hooked lip on the body.

4. The invention as defined in claim 2 wherein the ring-like member has opposed pairs of openings, and a U-shaped rope connecting bail having end fingers engaging in one of the pairs of openings.

5. A rope clamp, comprising spaced body parts joined by an extension, a hook-shaped keeper on the extension, said body parts each having a curved slot extending through the greater part of the diameter of the body and having an upwardly curved hook-shaped end to receive a loop in a rope end passing through the body.

6. The invention as defined in claim 5 wherein the body parts have openings for attaching the means to secure the body to a base, and wherein a ring-like part has openings to attach a rope end, and the ends of the bodies have notches at the extension.

7. The invention as defined in claim 1 wherein the extension has a hooked keeper spaced from the body, and a ring-like member at the end of the extension for attaching a rope.

8. The invention as defined in claim 2, wherein the ring-like member has opposed pairs of openings, one set adapted to receive the looped end of a rope and the other set being adapted to receive a U-shaped rope connecting bail, having end fingers engaging in the openings.

9. A rope clamp, comprising a cylindrical body formed with a curved slot extending through a greater diameter of the body, an extension on the body having an outwardly curved outer end, a ring-like part on the extension inwardly of the curved outer end to attach a rope end to, and a keeper on the extension intermediate of the ring-like part and the curved outer end to receive the rope before it is attached to the ring-like part.

GEORGE J. HOUSTON.